(12) United States Patent
Rall et al.

(10) Patent No.: US 7,877,193 B2
(45) Date of Patent: Jan. 25, 2011

(54) METHOD FOR OPERATING A SHUTOFF DEVICE FOR A DEVICE, IN PARTICULAR AN INTERNAL COMBUSTION ENGINE AND/OR AN ELECTRIC MACHINE, AS WELL AS A SHUTOFF DEVICE

(75) Inventors: Astrid Rall, Leingarten (DE); Gerit Von Schwertfuehrer, Bietigheim-Bissingen (DE); Holger Niemann, Ludwigsburg (DE); Per Hagman, Stuttgart (DE); Alexander Dubs, Ubstadt-Weiher (DE); Siegfried Greskamp, Weinsberg (DE); Daniel Damm, Ludwigsburg (DE); Michael Gloeckler, Schwieberdingen (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 11/999,447

(22) Filed: Dec. 3, 2007

(65) Prior Publication Data
US 2008/0154483 A1    Jun. 26, 2008

(30) Foreign Application Priority Data
Dec. 20, 2006  (DE)  ........................ 10 2006 060 307

(51) Int. Cl.
*F02D 45/00*  (2006.01)
*G06F 19/00*  (2006.01)
(52) U.S. Cl. ..................... 701/112; 123/198 D; 701/114
(58) Field of Classification Search ................. 701/112, 701/102, 101, 29–31, 33, 114; 123/198 D, 123/198 DB, 198 DC, 198 F, 179.4; 324/418; 73/114.58; 702/182–185
See application file for complete search history.

(56) References Cited

U.S. PATENT DOCUMENTS

| | | | | |
|---|---|---|---|---|
| 2,759,669 A * | 8/1956 | Knutsen | ...................... | 235/431 |
| 3,189,871 A * | 6/1965 | Hurley | ........................ | 714/16 |
| 4,809,177 A * | 2/1989 | Windle et al. | .................. | 701/1 |
| 4,811,710 A * | 3/1989 | Schmitt et al. | .............. | 123/359 |
| 4,811,711 A * | 3/1989 | Stumpp et al. | .............. | 123/359 |
| 5,249,609 A * | 10/1993 | Walker et al. | .................. | 141/4 |
| 5,359,540 A * | 10/1994 | Ortiz | ......................... | 700/295 |
| 5,409,045 A * | 4/1995 | Walker et al. | .................. | 141/4 |
| 5,549,097 A * | 8/1996 | Nimberger | ................. | 123/690 |
| 5,847,659 A * | 12/1998 | Mugitani | ............... | 340/825.29 |
| 6,026,454 A * | 2/2000 | Hauck et al. | .................. | 710/65 |
| 6,163,690 A * | 12/2000 | Lilja | ......................... | 455/574 |
| 6,542,071 B1 * | 4/2003 | Ohtsubo et al. | ........ | 340/426.28 |
| 6,882,155 B2 * | 4/2005 | Lazzaro | ..................... | 324/418 |
| 7,017,559 B2 * | 3/2006 | Mey et al. | .................. | 123/527 |
| 2002/0034321 A1 * | 3/2002 | Saito et al. | .................. | 382/124 |
| 2002/0195883 A1 | 12/2002 | Lazzaro | | |
| 2004/0260470 A1 * | 12/2004 | Rast | .......................... | 701/300 |
| 2006/0047978 A1 * | 3/2006 | Kawakami et al. | .......... | 713/193 |
| 2007/0204172 A1 * | 8/2007 | Kawakami et al. | .......... | 713/193 |

* cited by examiner

*Primary Examiner*—Willis R. Wolfe, Jr.
*Assistant Examiner*—Johnny H Hoang
(74) *Attorney, Agent, or Firm*—Kenyon & Kenyon LLP

(57) ABSTRACT

A method for operating a shutoff device for a device, in particular an internal combustion engine and/or an electric machine, in which an operating element for initiating a shutoff operation is provided, and in which a transmission path is provided via which a shutoff signal is transmitted from the operating element to the device in order to deactivate the device. The shutoff device is checked for proper functioning at least in part automatically, by automatically transmitting a shutoff signal, in particular from the operating element via the transmission path to the device.

16 Claims, 1 Drawing Sheet

METHOD FOR OPERATING A SHUTOFF DEVICE FOR A DEVICE, IN PARTICULAR AN INTERNAL COMBUSTION ENGINE AND/OR AN ELECTRIC MACHINE, AS WELL AS A SHUTOFF DEVICE

FIELD OF THE INVENTION

The present invention relates to a method for operating a shutoff device for a device, in particular an internal combustion engine and/or an electric machine, in which an operating element for initiating a shutoff operation is provided, and in which a transmission path is provided via which a shutoff signal is transmitted from the operating element to the device in order to deactivate the device. Furthermore, the present invention relates to a shutoff device, a control unit, and a computer program therefor.

BACKGROUND INFORMATION

Such methods and devices may include the actuation of an operating element, also referred to as emergency shutoff switch, which allows a reliable shutoff or deactivation of the device in the event of, for example, an imminent accident danger or in other critical operating states, the device being, for instance, an internal combustion engine or also an electric machine or some other machine.

Conventional emergency shutoff switches usually have a single channel, so that in the event of a fault in the particular channel, the device to be deactivated is not necessarily responsive to the emergency shutoff switch. As known, emergency shutoff switches are not operated on a regular basis but only in emergencies, so that such a fault would most likely not be discovered in a normal operating state of the device. Faults of this type are therefore also known as so-called "sleeping (latent) faults".

SUMMARY OF THE INVENTION

Therefore it is an object of the exemplary embodiments and/or the exemplary methods of the present invention to improve a method and a device of the type mentioned in the introduction, in such a way that latent faults are no longer able to occur or are at least detected so that a reliable operation of the shutoff device is ensured should the need arise.

According to the exemplary embodiments and/or the exemplary methods of the present invention, in the method of the type mentioned in the introduction this objective is achieved by checking the shutoff device for proper functioning at least in part automatically in that a shutoff signal is transmitted automatically, in particular from the operating element via the transmission path to the device.

The automatic check for proper functioning of the shutoff device according to the present invention effectively excludes the occurrence of a latent fault since the application of the method according to the present invention activates the shutoff device not only in an actual emergency but checks its function even without an emergency being at hand within the scope of the automatic check according to the present invention. Faults in the transmission path, which may include electrical and/or optical and/or hydraulic and/or pneumatic or other components, for example, are able to be effectively detected by the method according to the present invention.

An especially reliable detection of faults is ensured if the shutoff device is checked periodically, the check according to the present invention may take place at least once per operating cycle of the device.

According to the exemplary embodiments and/or the exemplary methods of the present invention, a reliable check of a functional state of the shutoff device is realized by the following steps:

Activation of the operating element so as to initiate the shutoff operation,

Detection of a state of the transmission path and/or the device,

Evaluation of the detected state, in particular comparison with a specifiable expected state, and Resetting of the shutoff device and/or its components and/or the device.

The detection of the state may advantageously also involve a check of the operating element itself, so that all components required for the function of the shutoff device are included in the automatic check of the present invention. By the comparison according to the present invention of the actually detected state to a specifiable, expected state that corresponds to proper functioning of the shutoff device, for example, particularly accurate conclusions may be drawn with regard to a malfunction that may have occurred.

An especially efficient execution of the check according to the present invention is ensured when a control unit is used that automatically carries out the steps of the method according to the present invention.

In order to document a possibly occurring fault of the shutoff device, the exemplary embodiments and/or the exemplary methods of the present invention advantageously provides the initiation of a fault response should an improper operating state be detected in the course of the check.

In shutoff devices of this type, which have an operating element that is not operable automatically, the automatic check according to the present invention may be carried out nonetheless, in that the activation of the operating element is advantageously simulated by providing an automatically operable auxiliary operating element situated in or upstream from the transmission path, which is actuated instead of the operating element.

The method according to the present invention is especially suited for the use in internal combustion engines, the transmission path including power-regulating actuators of the internal combustion engine, such as a fuel system or actuators that control a throttle valve.

Of particular importance is the implementation of the method according to the present invention in the form of a computer program which is able to run on a computer or a processing unit of a control device or a control unit, and which is programmed to execute the method. The computer program may be stored on an electronic storage medium, for example, the storage medium in turn being part of the control device, for example.

Further advantages, features and details result from the following description, in which different exemplary embodiments of the present invention are shown with reference to the drawing. In this context, the features mentioned in the claims and the specification may be essential to the present invention either alone or in any combination.

DETAILED DESCRIPTION

Figure 1:
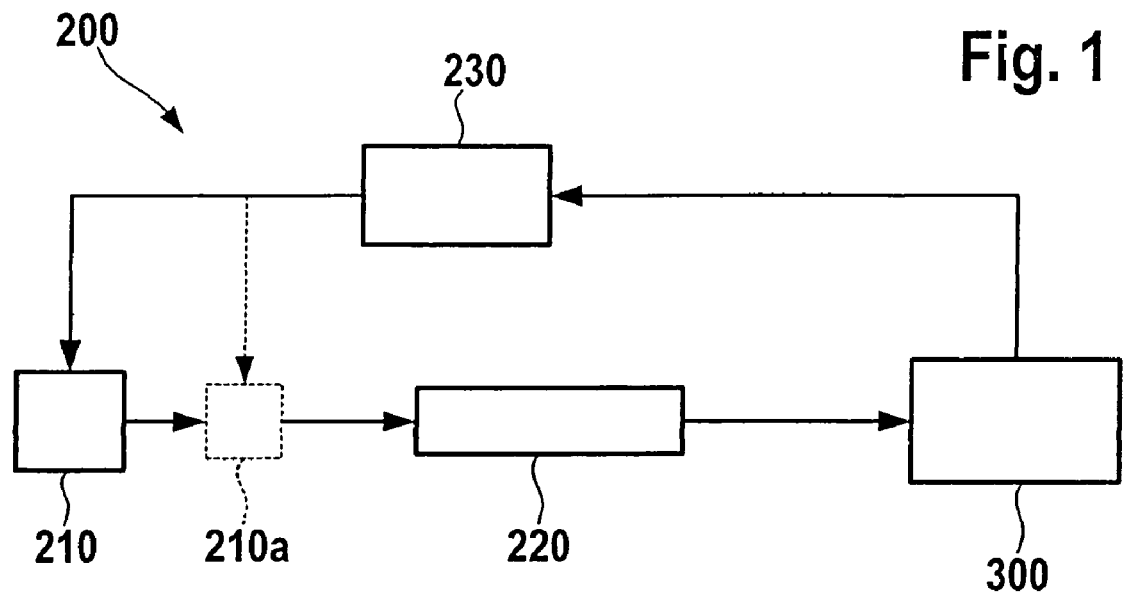
FIG. 1 shows a simplified block diagram of a shutoff device according to the present invention.

FIG. 1 schematically shows a shutoff device 200, which is used to shut off or deactivate device 300. Device 300 may be, for instance, an internal combustion engine, an electric machine or some other machine whose deactivation, with the aid of shutoff device 200 according to the present invention is desirable in dangerous operating states, in particular.

For this purpose, shutoff device 200 includes an operating element 210, which is also known as emergency shutoff switch, the operating element being actuable by a user of device 300 and initiating the shutoff operation of device 300. Upon actuation of operating element 210 during proper operation of shutoff device 200, a shutoff signal is transmitted from operating element 210 via transmission path 220 to device 300 for the purpose of deactivating it.

If device 300 is embodied as internal combustion engine, for example, transmission path 220 may include power-regulating actuators of internal combustion engine 300, which are able to control an output supplied by internal combustion engine 300 by appropriate control.

In the case of electric or other machines, different actuators known to the expert may be provided, such as relays or the like. In principle, transmission path 220 may include electrical and/or optical and/or hydraulic and/or pneumatic or other components utilizable for transmitting the shutoff signal.

Since shutoff devices 200 are normally used only in true emergency situations, a fault in the functioning of shutoff device 200 is disadvantageously noticed only in such an emergency situation.

Figure 2:
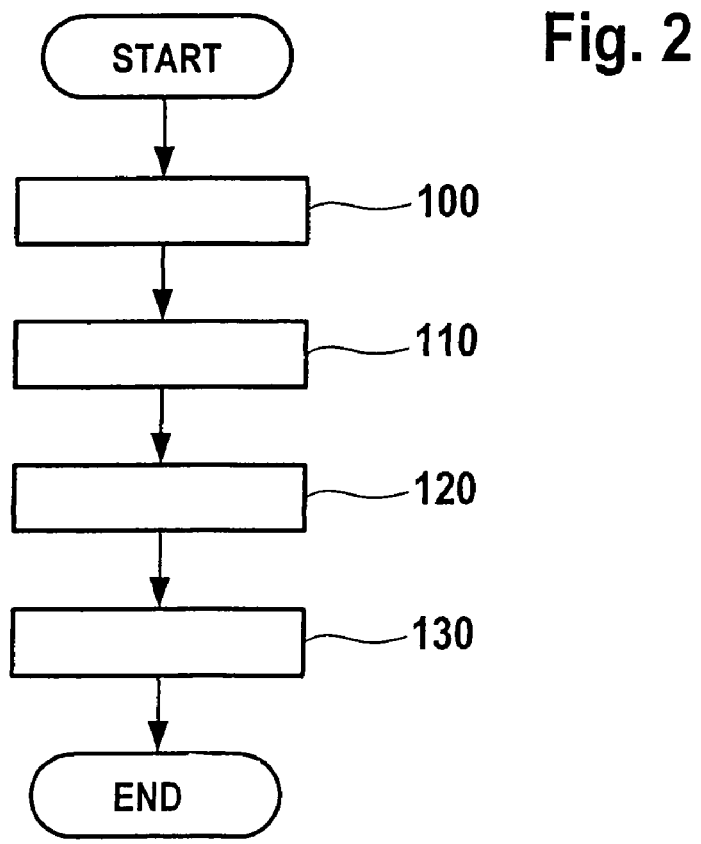
FIG. 2 shows a flow chart of a specific embodiment of the method according to the present invention.

To avoid the occurrence of such faults, which are also known as "sleeping (latent) faults", the method according to the present invention provides an automatic check of the function of shutoff device 200, which will be described in greater detail in the following text with reference to the flow chart in FIG. 2.

To begin with, operating element 210 is actuated in a first step 100 in order to initiate the shutoff operation. According to the present invention, a state of transmission path 220 and/or device 300 will then be detected in step 110. The detection may be implemented with the aid of a corresponding sensor array, for example, or by another arrangement for detecting operating information. In step 110, the state of operating element 210 itself is advantageously detected as well, which may be achieved via a monitoring channel or the like.

The detected state of transmission path 220 and/or device 300 and/or operating element 210 will then be evaluated in step 120 by a control unit 230 assigned to shutoff device 200 according to the exemplary embodiments and/or the exemplary methods of the present invention. During the evaluation the detected states or operating information may be compared to specifiable setpoint values, for example, in order to infer an improper operation from a possibly occurring discrepancy.

If an improper operating state of shutoff device 200 is detected, a fault response (not shown) is initiated according to the exemplary embodiments and/or the exemplary methods of the present invention.

However, if proper functioning of shutoff device 200 was determined, then shutoff device 200 is reset in step 130 in order to be available for subsequent normal operation.

Resetting 130 of shutoff device 200 and/or components 210, 220 thereof may include, for instance, resetting operating element 210 to an initial position, or also putting power-controlling actuators or other elements included in transmission path 220 into a corresponding initial position.

Since the method according to the present invention is advantageously executed automatically, a reliable detection of improper functional states and the initiation of a corresponding fault response are ensured without requiring an interaction with an operator.

If operating element 210 (FIG. 1) is not actuable automatically but only manually and thus is unable to be actuated accordingly by control unit 230 in step 100 of the method according to the present invention (FIG. 2), an automatically actuable auxiliary operating element 210a is advantageously provided, which control unit 230 is able to control or actuate instead of operating element 210.

Auxiliary operating element 210a may be disposed as closely as possible to operating element 210 in order to be able to check the largest possible portion of transmission path 220 or the components situated between operating element 210 and device 300 to be deactivated.

Using the method according to the present invention allows not only the reliable detection or the avoidance of latent faults, but also universal monitoring of the functional state of shutoff device 200, such monitoring checking both operating element 210 itself, transmission path 220 and power actuators disposed therein, or other components such as cable connections or the like, with regard to their function.

What is claimed is:

1. A method for operating a shutoff device for a motor vehicle device, the method comprising:
using an operating element to initiate a shutoff operation with a shutoff signal, wherein the shutoff signal is transmitted via a transmission path from the operating element to the shutoff device to deactivate the motor vehicle device; and
checking the shutoff device for proper functioning at least in part automatically, wherein the shutoff signal is transmitted automatically from the operating element via the transmission path to the motor vehicle device.

2. The method of claim 1, wherein the shutoff device is checked periodically at least once per operating cycle.

3. The method of claim 1, wherein the checking includes:
actuating the operating element to initiate the shutoff operation,
detecting a state of at least one of the transmission path and the device,
evaluating the detected state by comparing it with a specifiable expected state, and resetting at least one of the shutoff device and its components, and the device.

4. The method of claim 3, wherein the checking is implemented automatically under control of a control unit.

5. The method of claim 1, wherein a fault response is initiated if an improper operating state is detected during the checking.

6. The method of claim 1, wherein the actuating of the operating element is simulated by actuating an automatically actuable auxiliary element situated in or upstream from the transmission path.

7. The method of claim 1, wherein the device is an internal combustion engine, wherein the transmission path includes power-controlling actuators of the internal combustion engine.

8. The method of claim 1, wherein:
the shutoff device is checked periodically at least once per operating cycle,
a fault response is initiated if an improper operating state is detected during the checking, and the actuating of the operating element is simulated by actuating an automatically actuable auxiliary element situated in or upstream from the transmission path.

9. The method of claim 1, wherein:

the shutoff device is checked periodically at least once per operating cycle, a fault response is initiated if an improper operating state is detected during the checking, the actuating of the operating element is simulated by actuating an automatically actuable auxiliary element situated in or upstream from the transmission path, the checking includes actuating the operating element to initiate the shutoff operation, detecting a state of at least one of the transmission path and the device, evaluating the detected state by comparing it with a specifiable expected state, and resetting at least one of the shutoff device and its components, and the device, and the checking is implemented automatically under control of a control unit.

10. A computer readable medium having a computer program, which is executable by a processor, comprising:

program code for operating a shutoff device for a motor vehicle device by performing the following:

initiating an operating element to initiate a shutoff operation with a shutoff signal;

transmitting the shutoff signal via the transmission path from the operating element to the shutoff device to deactivate the motor vehicle device; and checking the shutoff device for proper functioning at least in part automatically, wherein the shutoff signal is transmitted automatically from the operating element via the transmission path to the motor vehicle device.

11. The computer readable medium of claim 10, wherein:

the shutoff device is checked periodically at least once per operating cycle, a fault response is initiated if an improper operating state is detected during the checking, the actuating of the operating element is simulated by actuating an automatically actuable auxiliary element situated in or upstream from the transmission path, the checking includes actuating the operating element to initiate the shutoff operation, detecting a state of at least one of the transmission path and the device, evaluating the detected state by comparing it with a specifiable expected state, and resetting at least one of the shutoff device and its components, and the device, and the checking is implemented automatically under control of a control unit.

12. A control unit for a shutoff device for a motor vehicle device, comprising:

a control arrangement to at least partially automatically check for proper functioning, by which a shutoff signal is automatically transmittable from an operating element via a transmission path to the motor vehicle device;

wherein the shutoff device includes the operating element for initiating a shutoff operation, and wherein the transmission path, via which the shutoff signal is transmittable from the operating element to the motor vehicle device to deactivate the motor vehicle device.

13. The control unit of claim 12, wherein:

the shutoff device is checked periodically at least once per operating cycle, a fault response is initiated if an improper operating state is detected during the checking, the actuating of the operating element is simulated by actuating an automatically actuable auxiliary element situated in or upstream from the transmission path, the checking includes actuating the operating element to initiate the shutoff operation, detecting a state of at least one of the transmission path and the device, evaluating the detected state by comparing it with a specifiable expected state, and resetting at least one of the shutoff device and its components, and the device, and the checking is implemented automatically under control of a control unit.

14. A shutoff device for an internal combustion engine, comprising:

an operating element for initiating a shutoff operation; and a transmission path, via which a shutoff signal is transmittable from the operating element to the motor vehicle device to deactivate the motor vehicle device;

wherein the shutoff device includes a control unit to at least partially automatically check for proper functioning, by which a shutoff signal is automatically transmittable from the operating element via the transmission path to the motor vehicle device.

15. The shutoff device of claim 14, wherein at least one of an operating element and an auxiliary operating element is actuatable automatically by the control unit.

16. The shutoff device of claim 14, wherein:

the shutoff device is checked periodically at least once per operating cycle, a fault response is initiated if an improper operating state is detected during the checking, the actuating of the operating element is simulated by actuating an automatically actuable auxiliary element situated in or upstream from the transmission path, the checking includes actuating the operating element to initiate the shutoff operation, detecting a state of at least one of the transmission path and the device, evaluating the detected state by comparing it with a specifiable expected state, and resetting at least one of the shutoff device and its components, and the device, and the checking is implemented automatically under control of a control unit.

* * * * *